(12) United States Patent
Klassen et al.

(10) Patent No.: US 12,031,367 B2
(45) Date of Patent: Jul. 9, 2024

(54) OPENING SYSTEM FOR A DOOR (71) Applicant: AIRBUS HELICOPTERS DEUTSCHLAND GMBH, Donauworth (DE)

(72) Inventors: Viktor Klassen, Bobingen (DE); Johannes Hommel, Dillingen (DE); Sebastien Testa, Donauworth (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 166 days.

(21) Appl. No.: 17/667,394

(22) Filed: Feb. 8, 2022

(65) Prior Publication Data
US 2022/0307303 A1 Sep. 29, 2022

(30) Foreign Application Priority Data
Mar. 29, 2021 (EP) ..................................... 21400007

(51) Int. Cl.
*E05D 11/10* (2006.01)
*B64D 29/06* (2006.01)
(Continued)

(52) U.S. Cl.
CPC .......... *E05D 11/1007* (2013.01); *B64D 29/06* (2013.01); *B64D 29/08* (2013.01); *E05D 3/02* (2013.01); *E05D 5/0207* (2013.01)

(58) Field of Classification Search
CPC ..... E05D 11/1007; E05D 3/02; E05D 5/0207; E05D 11/1014; B64D 29/06; B64D 29/08
See application file for complete search history.

(56) References Cited

U.S. PATENT DOCUMENTS

2002/0140238 A1* 10/2002 Jackson ................ B64D 29/06
292/263
2015/0078879 A1 3/2015 Vaughan et al.
(Continued)

FOREIGN PATENT DOCUMENTS

CN 107380401 A 11/2017
CN 110937100 A 3/2020
(Continued)

OTHER PUBLICATIONS

European Search Report for European Application No. EP 21400007.7, Completed by the European Patent Office, Dated Aug. 27, 2021, 6 pages.
(Continued)

*Primary Examiner* — Rodney A Bonnette
(74) *Attorney, Agent, or Firm* — Brooks Kushman P.C.

(57) ABSTRACT

An opening system for a cowling access door, to a cowling access door with such an opening system for a cowling of an aircraft, to an aircraft comprising such a cowling access door, and to a method of operating such an opening system. The opening system may include an overcentering latch that automatically latches in the over-centered state to prevent the cowling access door from returning to the closed position, and a release system that is coupled to the overcentering latch and adapted for transitioning the overcentering latch from the over-centered state to an unclamped state. The opening system further includes a remote actuator that is located spaced apart from the release system and adapted for remotely actuating the release system.

18 Claims, 6 Drawing Sheets

(51) Int. Cl.
    *B64D 29/08*     (2006.01)
    *E05D 3/02*     (2006.01)
    *E05D 5/02*     (2006.01)

(56) References Cited

U.S. PATENT DOCUMENTS

| | | |
|---|---|---|
| 2016/0201371 A1 | 7/2016 | Harding et al. |
| 2017/0313402 A1 | 11/2017 | Flores et al. |
| 2018/0057183 A1 | 3/2018 | Le Cadet et al. |
| 2018/0362173 A1 | 12/2018 | Delaney et al. |
| 2018/0362175 A1* | 12/2018 | Scannell ................. B64F 5/40 |

FOREIGN PATENT DOCUMENTS

| | | |
|---|---|---|
| CN | 112065182 A | 12/2020 |
| EP | 0839714 A1 | 5/1998 |
| EP | 1719865 A2 | 11/2006 |
| EP | 1719865 A3 | 9/2009 |
| WO | 9951490 A1 | 10/1999 |
| WO | 02055816 A2 | 7/2002 |

OTHER PUBLICATIONS

First Office Action for Chinese Patent Application No. 202210156564.9, dated Aug. 14, 2023, 21 pages (including English Translation).

* cited by examiner

OPENING SYSTEM FOR A DOOR

CROSS-REFERENCE TO RELATED APPLICATIONS

This application claims priority to European patent application No. EP 21400007.7 filed on Mar. 29, 2021, the disclosure of which is incorporated in its entirety by reference herein.

TECHNICAL FIELD

The present embodiments relate to an opening system for a door, and, more particularly, to an opening system for a cowling access door of a cowling. The present embodiments further relate to a cowling access door with such an opening system for a cowling of an aircraft, to an aircraft comprising such a cowling access door, and to a method of operating such an opening system.

BACKGROUND

In aviation, a cowling may be used for drag reduction or engine cooling by directing airflow. The cowling may also cover a part of the fuselage, the engines, and/or a part of the cockpit. Cowling access doors usually provide access to the machinery that is hidden from the outside by the cowling, for example to enable maintenance work on that machinery.

During such maintenance work, opening systems that may be mounted to the cowling or to the cowling access door usually secure the cowling access door in an opened position. Traditional opening systems that enable the securing of the cowling access door in an opened position include gas springs and/or hold open rods.

Such gas springs and/or hold open rods usually extend from one extremity of the cowling access door to the remaining part of the cowling. Unfortunately, gas springs and/or hold open rods often restrict and/or hinder a maintenance worker's access to the machinery. Moreover, gas springs do not protect against unintended closing of the cowling access door and require maintenance due to the aging of gaskets, while hold open rods require a two-hands operation and take a lot of space for installation.

Alternatively, opening systems sometimes include the use of folding struts for securing a cowling access door in an open position. Such folding struts are usually not in the way of maintenance workers. However, folding struts usually also require a two-hands operation.

Document EP 0 839 714 A1 describes a latch for a thrust reverser duct on an aircraft engine. The latch accomplishes work during both the closing stroke and the handle folding stroke. An outer handle release trigger can lock an outer handle to an inner handle to fix the relative position of the outer handle, the inner handle, an idler link, a rocker link and a secondary link. While they are in fixed position, the parts act as a closing handle unit during the closing stroke. Once the closing stroke is completed, the inner handle is locked into a fixed position with hook arm and a primary link. The outer handler release trigger can then be disengaged and the secondary link, the rocker link and the idler link work to provide mechanical advantage during the folding of the outer handle.

Document EP 1 066 195 A1 describes a remotely actuated latch mechanism for securing a cowling to an engine pylon including a handle having a closed and an open position which is connected to a remote latch. The remote latch comprises a housing, a linking mechanism mounted to the housing, and a strut connected to the linking mechanism at a first end and to a keeper at a second end. The handle is connected to the linking mechanism of the remote latch by a push/pull cable. The actuation of the handle from the closed position to the open position causes the push/pull cable to move the linking mechanism of the remote latch such that the strut moves from a closed to an open position relative to the keeper allowing the cowling of the aircraft to then be pivoted open. The strut and the keeper are securely engaged in both the open and closed position insuring that when the latch is remotely opened and closed that the keeper is always properly engaged and that the latch properly closes.

Document EP 1 379 745 A2 describes a lever that is actuatable to unlatch a pawl when the lever is in an unlocked position. When the lever is in a locked position, lever actuation cannot unlatch the pawl. An over-center device coupled to the lever can be used to position the lever in its locked and unlocked positions. In some embodiments, the lever is moved away from the pawl when the lever is in a locked position and is moved closer to the pawl when the lever is in an unlocked position. In other embodiments, the lever is pivotable about a pivot point that remains in the same location with respect to the lever in the unlocked and locked positions thereof. Although not required, the pawl is preferably movable by the lever to its unlatched state after the partially or fully-actuated lever has been moved to its unlocked state. Documents US2018057183, EP1719865 and US2015078879 were cited.

However, the above-described opening systems all lack an automatic latching feature to automatically secure the associated cowling access door in the opened position during an opening operation. Some also require a two-hand operation during an opening and/or a closing operation of the cowling access door.

SUMMARY

It is, therefore, an objective to provide a new opening system for a cowling access door that automatically secures the cowling access door in the opened position during an opening operation, is operable with a single hand, prevents an unintended closing during maintenance work, has an easily accessible release mechanism, a very compact design and comprises less constituent components, is easier to produce and assemble, and comparatively inexpensive to manufacture compared to state-of-the-art opening systems. Furthermore, it is an objective to provide a new cowling access door comprising such a new opening system and a method for operating such a new opening system.

This objective is solved by an actuating system for an actuatable door, said actuating system comprising the features of claim 1.

More specifically, an opening system for a cowling access door of a cowling, the cowling access door being movable between a closed position and an opened position, comprises a cowling access door holder, a remote actuator, and a hinge bracket that is adapted for pivotally attaching the cowling access door to the cowling. The cowling access door holder comprises an overcentering latch that is in an unclamped state when the cowling access door is in the closed position and movable from the unclamped state to an over-centered state when the cowling access door is moved from the closed position to the opened position, wherein the overcentering latch automatically latches in the over-centered state to prevent the cowling access door from returning to the closed position, and a release system that is coupled to the overcentering latch and adapted for transitioning the overcentering latch from the over-centered state to the unclamped state. The remote actuator is located spaced apart from the release system on the cowling access door and adapted for remotely actuating the release system.

The opening system is holding the cowling access door in an opened position and prevents an unintended closing of the cowling access door. The release system is installed in an easily accessible location. The unlocking is activated from this easily accessible location.

Illustratively, the opening system may include two rods, a release lever, a Bowden cable, and a thumb lever.

During the opening of the cowling access door, the opening system is moving the overcentering latch over the center position in which the overcentering latch is in the centered state to the clamped position in which the overcentering latch is in the over-centered state. In the clamped position, the cowling access door is secured in the open position.

During the closing of the cowling access door, the cowling access door is pushed towards the highest position which is also the maximal opening point, in which the overcentering latch is going to the center position. In this position, the release lever can be activated. For example, a maintenance worker may push with a thumb onto a release lever. Via a Bowden cable, the release lever may move the overcentering latch from the center position to an unclamped position. Once the overcentering latch has reached the unclamped position, the cowling access door can be let down towards the closed position.

Thus, the opening system may be operated with a single hand during opening and closing operations. Furthermore, the opening system prevents unintended closing during maintenance work, and the release mechanism is located in an easily accessible location on the cowling access door, thereby enabling an ergonomic operation of the cowling access door.

According to one aspect, the overcentering latch further comprises a first rod having a first end and a second end, wherein the first end is adapted for being pivotally attached to the cowling; and a second rod having a third end and a fourth end, wherein the third end is pivotally attached to the second end of the first rod.

According to one aspect, the release system further comprises a release lever that is pivotally attached to the hinge bracket at a release lever attachment point and coupled to the fourth end of the second rod.

According to one aspect, the release lever rotates around the release lever attachment point in response to a pull on the release lever, thereby moving the second rod from an over-centered position in which the overcentering latch is in the over-centered state to an unclamped position in which the overcentering latch is in the unclamped state.

According to one aspect, the release lever attachment point and the fourth end of the second rod coincide.

According to one aspect, the release lever attachment point and the fourth end of the second rod are separated.

According to one aspect, the opening system further comprises a Bowden cable that connects the remote actuator with the release system.

According to one aspect, the release system further comprises a cable guide that is attached to the hinge bracket and guides the Bowden cable at least partially along the hinge bracket to the release system.

According to one aspect, the remote actuator pulls on the Bowden cable upon actuation.

According to one aspect, the remote actuator further comprises a thumb lever that is adapted for being pivotally attached to the cowling access door and for pulling on the Bowden cable upon actuation.

Furthermore, a cowling access door for a cowling of an aircraft may comprise the opening system described above.

Moreover, an aircraft may comprise the cowling access door described above.

Furthermore, a method of operating the opening system described above may comprise the operations of, with the hinge bracket, moving the overcentering latch from an unclamped state in which the cowling access door is in the closed position to an over-centered state in which the cowling access door is in the opened position; and with the overcentering latch, automatically latching in the over-centered state to prevent the cowling access door from returning to the closed position.

According to one aspect, the method may further comprise the operation of, with the remote actuator, remotely actuating the release system.

According to one aspect, the method may further comprise the operation of, in response to being actuated by the remote actuator, using the release system for transitioning the overcentering latch from the over-centered state to the unclamped state.

BRIEF DESCRIPTION OF THE DRAWINGS

Preferred embodiments are outlined by way of example in the following description with reference to the attached drawings. In these attached drawings, identical or identically functioning components and elements are labelled with identical reference numbers and characters and are, consequently, only described once in the following description.

DETAILED DESCRIPTION

Exemplary embodiments may be used with any vehicle having a cowling, whereby the cowling encloses machinery that needs to be accessible for maintenance work through cowling access doors. Examples for vehicles may include aircraft such as airplanes, quadcopters, helicopters, and drones, land-based vehicles including cars, buses, trucks, and motorcycles, or vessels such as ships and boats, etc.

Figure 1:
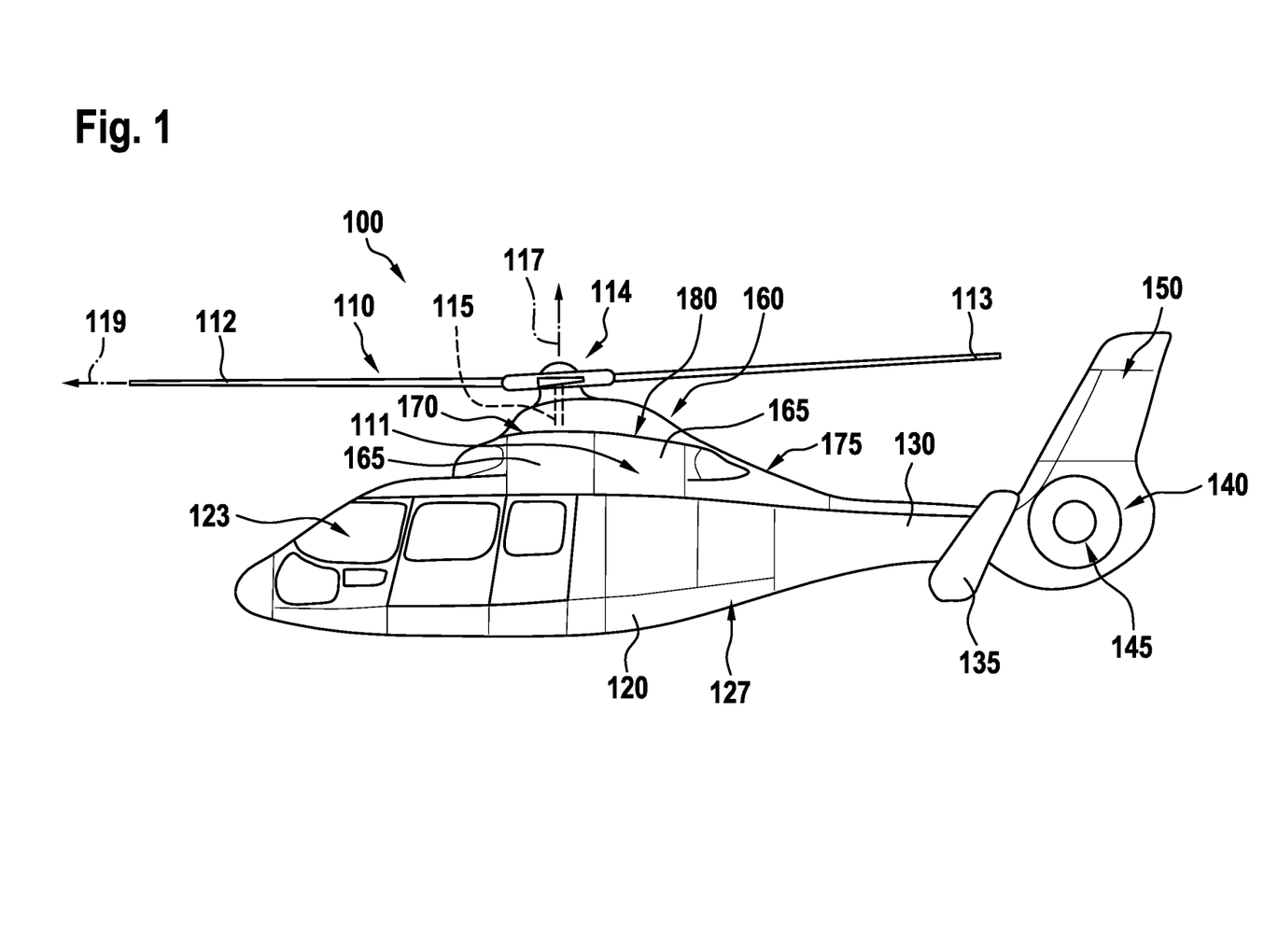
FIG. 1 is a diagram of an illustrative rotary-wing aircraft with illustrative cowling access doors for the cowling in accordance with some embodiments.

FIG. 1 is a diagram of an illustrative aircraft that is embodied as a rotary-wing aircraft 100 having at least one rotor system 110 with a rotor shaft 115. As shown in FIG. 1, the rotary-wing aircraft 100, which is sometimes also referred to as rotorcraft 100, is exemplarily illustrated as a helicopter. Thus, for purposes of simplicity and clarity, the rotorcraft 100 is hereinafter referred to as the "helicopter" 100.

Illustratively, helicopter 100 may have a fuselage 120 that forms an airframe of the helicopter 100. The fuselage 120 is connected to a suitable landing gear and exemplarily forms a cabin 123 and a rear fuselage 127. The rear fuselage 127 is connected to a tail boom 130.

By way of example, helicopter 100 may include at least one counter-torque device 140 configured to provide counter-torque during operation, i.e., to counter the torque created by rotation of the at least one rotor system 110 for purposes of balancing the helicopter 100 in terms of yaw. If desired, counter-torque device 140 may be shrouded.

The at least one counter-torque device 140 is illustratively provided at an aft section of the tail boom 130 and may have a tail rotor 145. The aft section of the tail boom 130 may include a fin 150. Illustratively, the tail boom 130 may be provided with a suitable horizontal stabilizer 135.

Illustratively, helicopter 100 may have at least one rotor system 110, which is illustratively provided as a multi-blade rotor system 110, for providing lift and forward or backward thrust during operation. The at least one rotor system 110 comprises an engine 111 coupled to a plurality of rotor blades 112, 113. By way of example, the plurality of rotor blades 112, 113 may be mounted at an associated rotor head 114 to a rotor shaft 115, which rotates in operation of the helicopter 100 around an associated rotation axis 117 in a rotor plane 119.

By way of example, helicopter 100 may include a cowling 160 with a cowling access door 165. The cowling 160 may cover at least the engine 111 of the helicopter 100. If desired, the cowling 160 may cover a transmission system of the helicopter 100. The transmission system may include a gear box.

As shown in FIG. 1, the cowling 160 may include a transmission cowling 170, a crest cowling 175, and an engine cowling 180.

Illustratively, helicopter 100 may include a single cowling access door 165 that provides access to the machinery behind the cowling 160. If desired, the helicopter 100 may include separate cowling access doors 165 for the transmission cowling 170, the crest cowling 175, and the engine cowling 180.

Figure 2:
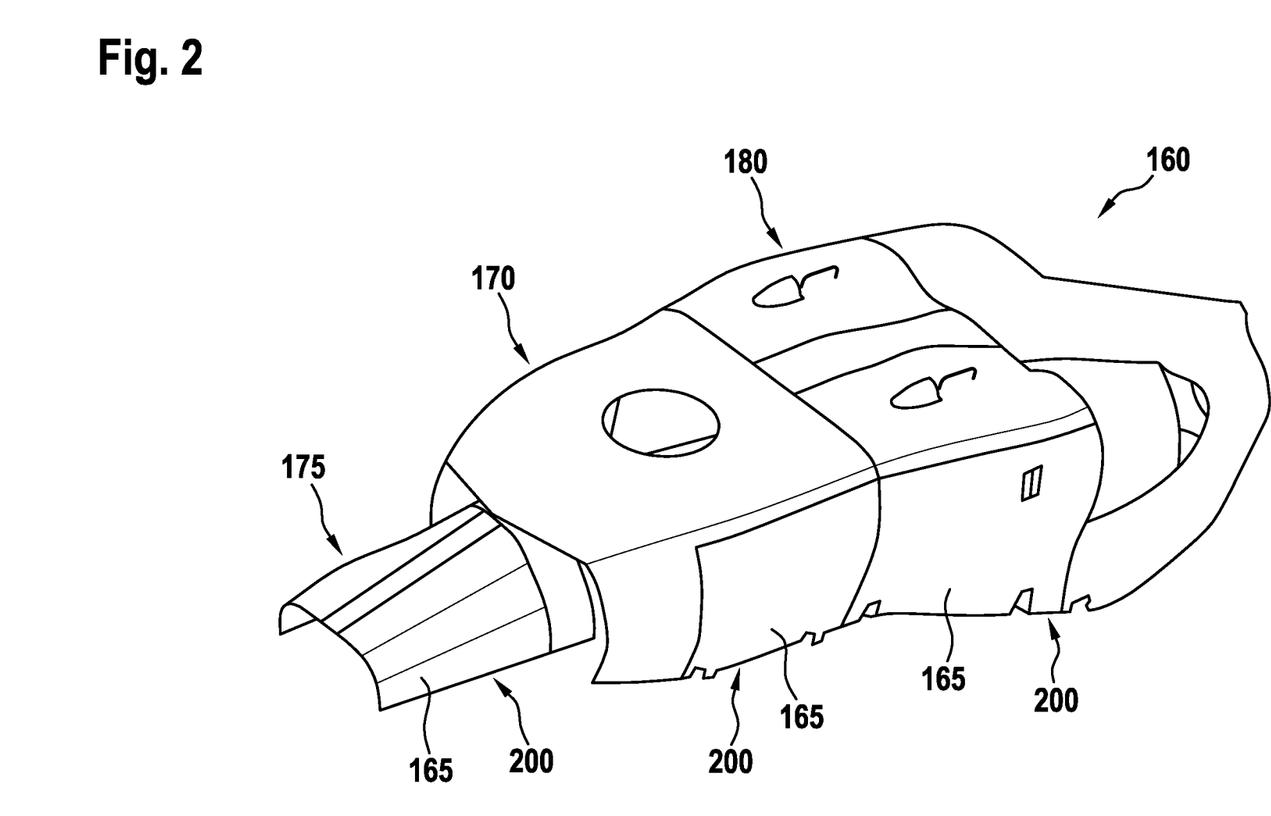
FIG. 2 shows an enlarged view of the illustrative cowling of FIG. 1 with a focus on the illustrative cowling access doors in accordance with some embodiments.

FIG. 2 shows an enlarged view of the illustrative cowling 160 of FIG. 1 with a focus on the illustrative cowling access doors 165. As shown in FIG. 2, the cowling 160 includes an engine cowling 180 with a cowling access door 165, a transmission cowling 170 with a cowling access door 165, and a crest cowling 175 with a cowling access door 165.

Illustratively, a cowling access door 165 may be movable between a closed position and an opened position. In the closed position, the cowling access door 165 may close an opening in the cowling 160, thereby preventing access from outside the cowling 160 to the underlying machinery. In the opened position, the cowling access door 165 may provide access from outside the cowling 160 to the underlying machinery, such as the engine or the transmission system. For example, the cowling access doors 165 may provide access for performing maintenance work on the machinery.

At least one, and preferably all cowling access doors 165 may include an opening system 200 as described in more detail in FIGS. 3 to 7C.

Figure 3:
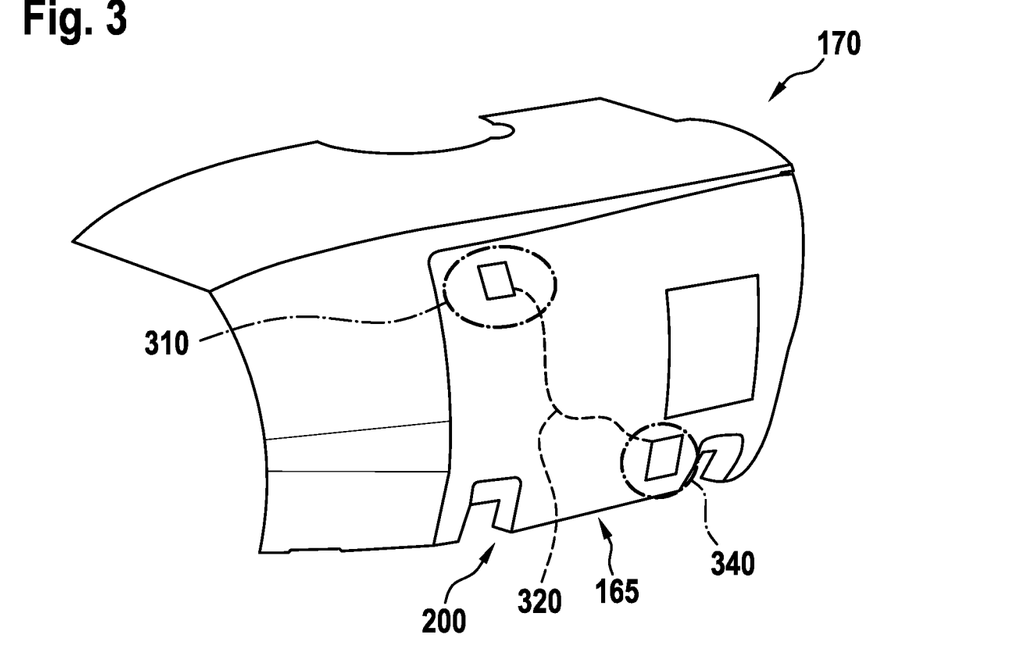
FIG. 3 is a diagram of an illustrative cowling access door for an aircraft's transmission cowling with an illustrative opening system in accordance with some embodiments.
Figure 4:
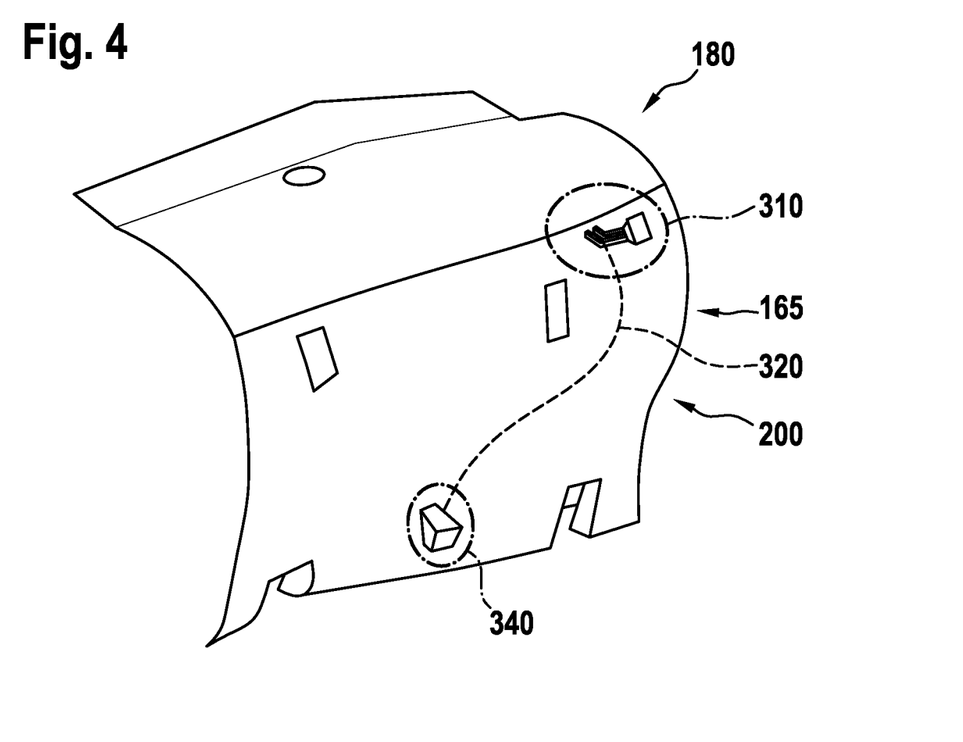
FIG. 4 is a diagram of an illustrative cowling access door for an aircraft's engine cowling with an illustrative opening system in accordance with some embodiments.

FIG. 3 is a diagram of an illustrative cowling access door 165 for an aircraft's transmission cowling 170, and FIG. 4 is a diagram of an illustrative cowling access door 165 for an aircraft's engine cowling 180. The cowling access doors 165 are shown in a closed position. Illustratively, the cowling access doors 165 may be rotatably moved upwards into an opened position.

The cowling access doors 165 of FIG. 3 and FIG. 4 may have an illustrative opening system 200. The illustrative opening system 200 may include a cowling access door holder 310.

The cowling access door holder 310 may be located close to a rotation axis around which the cowling access door 165 rotates when moving from the closed to an opened position. Illustratively, the cowling access door holder 310 may automatically secure the cowling access door 165 in an opened position.

If desired, the cowling access door holder 310 may include a release system. The release system may be adapted to release the cowling access door 165 from the secured position.

Illustratively, the opening system 200 may include a remote actuator 340. The remote actuator 340 may be adapted for remotely actuating the release system. For example, a Bowden cable 320 may connect the remote actuator 340 with the release system. By way of example, the remote actuator 340 may pull on the Bowden cable 320 upon actuation.

The remote actuator 340 may be located spaced apart from the release system on the cowling access door 165. As shown in FIG. 3 and FIG. 4, the remote actuator 340 may be located in the lower portion of the cowling access door 165. Preferably, the remote actuator 340 may be located approximately in the middle of the cowling access door 165, for example to enable a single-hand operation of the opening system 200.

Figure 5:
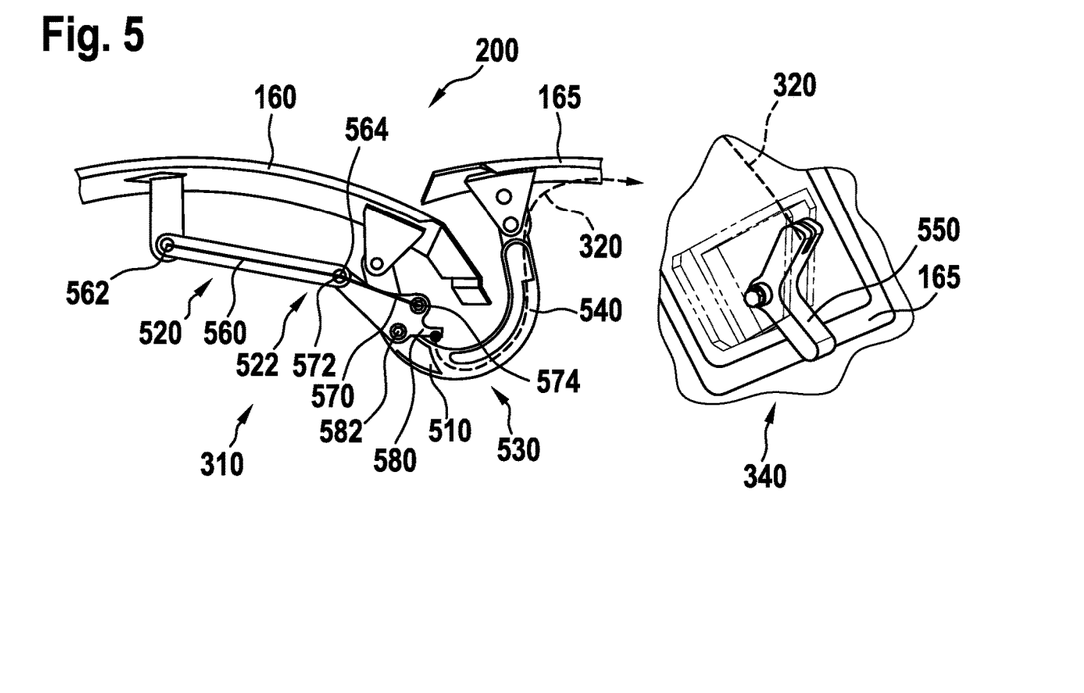
FIG. 5 is a diagram of an illustrative opening system for a cowling access door with separate rod and release lever attachment points in accordance with some embodiments.

FIG. 5 is a diagram of an illustrative opening system 200 for a cowling access door 165 of a cowling 160. The cowling access door 165 may be movable between a closed position and an opened position. As shown in FIG. 5, the cowling access door is in an opened position.

Illustratively, the opening system 200 may include a bracket 510. The bracket 510 may be adapted for pivotally attaching the cowling access door 165 to the cowling 160. Thus, the bracket 510 is sometimes and hereinafter also referred to as a hinge bracket 510.

By way of example, the opening system 200 may include a cowling access door holder 310. The cowling access door holder 310 may include an overcentering latch 520 and a release system 530.

The overcentering latch 520 may be in an unclamped state 522 when the cowling access door 165 is in the closed position. The overcentering latch 520 may be movable from the unclamped state 522 to an over-centered state when the cowling access door 165 is moved from the closed position to the opened position. Thereby, the overcentering latch 520 may remain in the unclamped state until the cowling access door 165 reaches a maximal opening point in which the overcentering latch 520 transitions into a centered state. If desired, the overcentering latch 520 automatically latches in the over-centered state to prevent the cowling access door 165 from returning to the closed position.

Illustratively, the overcentering latch 520 may include a first rod 560 having a first end 562 and a second end 564. By way of example, the overcentering latch 520 may include a second rod 570 having a third end 572 and a fourth end 574.

The first end 562 of the first rod 560 may be adapted for being pivotally attached to the cowling 160. The third end 572 of the second rod 570 may be pivotally attached to the second end 564 of the first rod 560.

As shown in FIG. 5, the distance between the attachment of the bracket 510 to the cowling 160 and the attachment of the first rod 560 to the cowling 160 may be greater than the length of the first rod 560 or the length of the second rod 570.

Illustratively, the release system 530 may be coupled to the overcentering latch 520. The release system 530 may be adapted for transitioning the overcentering latch 520 from the over-centered state to the unclamped state 522.

By way of example, the release system 530 may include a release lever 580. The release lever 580 may be pivotally attached to the bracket 510 at a release lever attachment point 582 and coupled to the fourth end 574 of the second rod 570. As shown in FIG. 5, the release lever attachment point 582 and the fourth end 574 of the second rod 570 are separated.

Illustratively, the release lever 580 may rotate around the release lever attachment point 582 in response to a pull on the release lever 580, thereby moving the second rod 570 from an over-centered position in which the overcentering latch 520 is in the over-centered state to an unclamped position in which the overcentering latch 520 is in the unclamped state.

The opening system 200 may exemplarily include a remote actuator 340. The remote actuator 340 may be located spaced apart from the release system 530 on the cowling access door 165. The remote actuator 340 may be adapted for remotely actuating the release system 530.

For example, a Bowden cable 320 may connect the remote actuator 340 with the release system 530. Illustratively, the remote actuator 340 may pull on the Bowden cable 320 upon actuation.

As shown in FIG. 5, the release lever 580 may form a lever arm that extends from the fourth end 574 of the second rod 570 in a direction that is opposite the direction from the fourth end 574 to the third end 572.

If desired, the Bowden cable 320 may be attached to the release lever 580 at this lever arm such that a pull on the lever arm causes, through a rotation around the release lever attachment point 582, a move of the third end 572 in the opposite direction. As an example, a pull on the lever arm may cause a downward movement of the lever arm and an upward movement of the third end 572 of the second rod 570. As another example, a push on the lever arm may cause an upward movement of the lever arm and a downward movement of the third end 572 of the second rod 570.

By way of example, the remote actuator 340 may include a thumb lever 550. The thumb lever 550 may be adapted for being pivotally attached to the cowling access door 165. If desired, the thumb lever 550 may be adapted for pulling on the Bowden cable 320 upon actuation.

For example, a push onto a portion of the thumb lever 550 may be translated by the attachment at the cowling access door 165 into a pivotal movement of the thumb lever 550 around the attachment and thereby into a pulling on the Bowden cable 320.

Illustratively, the release system 530 may include a cable guide 540. The cable guide 540 may be attached to the bracket 510. Thus, the cable guide 540 may guide the Bowden cable 320 at least partially along the bracket 510 to the release system 530. If desired, the cable guide 540 may further be attached to the cowling access door 165 between the cowling access door holder 310 and the remote actuator 340.

Figure 6:
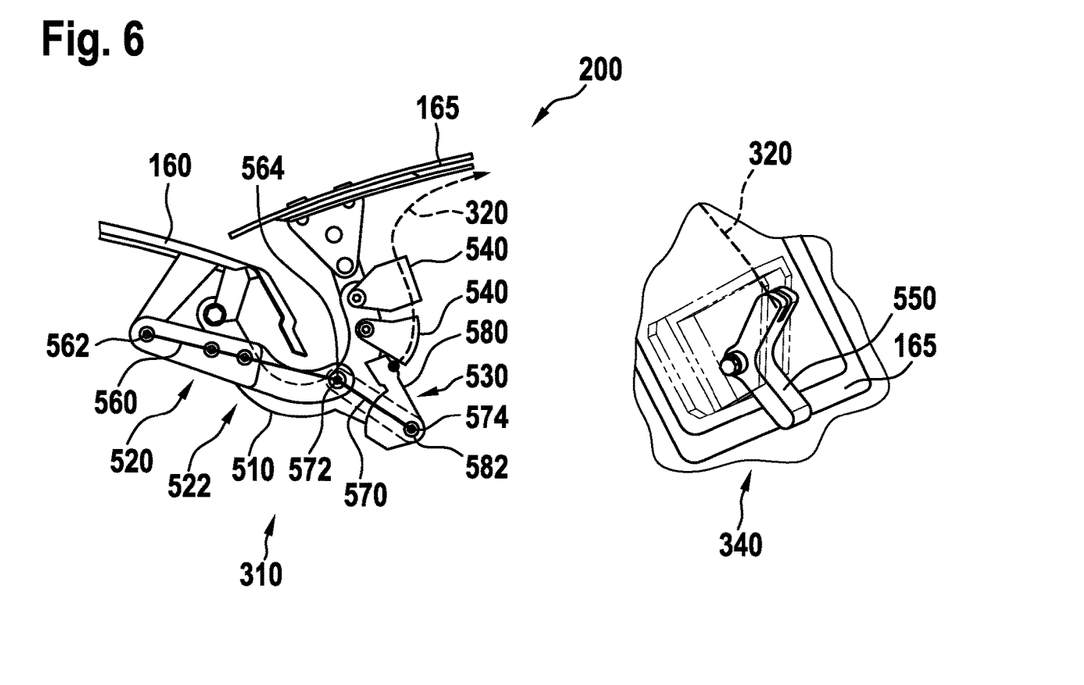
FIG. 6 is a diagram of an illustrative opening system for a cowling access door with coinciding rod and release lever attachment points in accordance with some embodiments.

FIG. 6 is a diagram of an illustrative opening system 200 for a cowling access door 165 of a cowling 160. The cowling access door 165 may be movable between a closed position and an opened position. As shown in FIG. 6, the cowling access door is in an opened position.

Illustratively, the opening system 200 may include a bracket 510. The bracket 510 may be adapted for pivotally attaching the cowling access door 165 to the cowling 160.

By way of example, the opening system 200 may include a cowling access door holder 310. The cowling access door holder 310 may include an overcentering latch 520 and a release system 530.

The overcentering latch 520 may be in an unclamped state 522 when the cowling access door 165 is in the closed position. The overcentering latch 520 may be movable from the unclamped state 522 to an over-centered state when the cowling access door 165 is moved from the closed position to the opened position. Thereby, the overcentering latch 520 may remain in the unclamped state until the cowling access door 165 reaches a maximal opening point in which the overcentering latch 520 transitions into a centered state. If desired, the overcentering latch 520 automatically latches in the over-centered state to prevent the cowling access door 165 from returning to the closed position.

Illustratively, the overcentering latch 520 may include a first rod 560 having a first end 562 and a second end 564. By way of example, the overcentering latch 520 may include a second rod 570 having a third end 572 and a fourth end 574.

The first end 562 of the first rod 560 may be adapted for being pivotally attached to the cowling 160. The third end 572 of the second rod 570 may be pivotally attached to the second end 564 of the first rod 560.

As shown in FIG. 6, the distance between the attachment of the bracket 510 to the cowling 160 and the attachment of the first rod 560 to the cowling 160 may be smaller than the length of the first rod 560 or the length of the second rod 570.

Illustratively, the opening system 200 may include a release system 530 that is coupled to the overcentering latch 520. The release system 530 may be adapted for transitioning the overcentering latch 520 from the over-centered state to the unclamped state 522.

By way of example, the release system 530 may include a release lever 580. The release lever 580 may be pivotally attached to the bracket 510 at a release lever attachment point 582 and coupled to the fourth end 574 of the second rod 570. As shown in FIG. 6, the release lever attachment point 582 and the fourth end 574 of the second rod 570 coincide.

Illustratively, the release lever 580 may rotate around the release lever attachment point 582 in response to a pull on the release lever 580, thereby moving the second rod 570 from an over-centered position in which the overcentering latch 520 is in the over-centered state to an unclamped position in which the overcentering latch 520 is in the unclamped state.

The opening system 200 may exemplarily include a remote actuator 340. The remote actuator 340 may be located spaced apart from the release system 530 on the cowling access door 165. The remote actuator 340 may be adapted for remotely actuating the release system 530.

For example, a Bowden cable 320 may connect the remote actuator 340 with the release system 530. Illustratively, the remote actuator 340 may pull on the Bowden cable 320 upon actuation.

As shown in FIG. 6, the Bowden cable 320 may be attached to the release lever 580 between the third end 572 and the fourth end 574 of the second rod 570 such that a pull at the attachment of the Bowden cable 320 causes a move of the third end 572 in the same direction. As an example, a pull on the release lever 580 may cause an upward movement of the attachment of the Bowden cable 320 and an upward movement of the third end 572 of the second rod 570. As another example, a push on the release lever 580 may cause a downward movement of the attachment of the Bowden cable 320 and a downward movement of the third end 572 of the second rod 570.

By way of example, the remote actuator 340 may include a thumb lever 550. The thumb lever 550 may be adapted for being pivotally attached to the cowling access door 165. If desired, the thumb lever 550 may be adapted for pulling on the Bowden cable 320 upon actuation.

For example, a push onto a portion of the thumb lever 550 may be translated by the attachment at the cowling access door 165 into a pivotal movement of the thumb lever 550 around the attachment and thereby into a pulling on the Bowden cable 320.

Illustratively, the release system 530 may include a cable guide 540. The cable guide 540 may be attached to the bracket 510. Thus, the cable guide 540 may guide the Bowden cable 320 at least partially along the bracket 510 to the release system 530. If desired, the cable guide 540 may further be attached to the cowling access door 165 between the cowling access door holder 310 and the remote actuator 340.

Figure 7A:
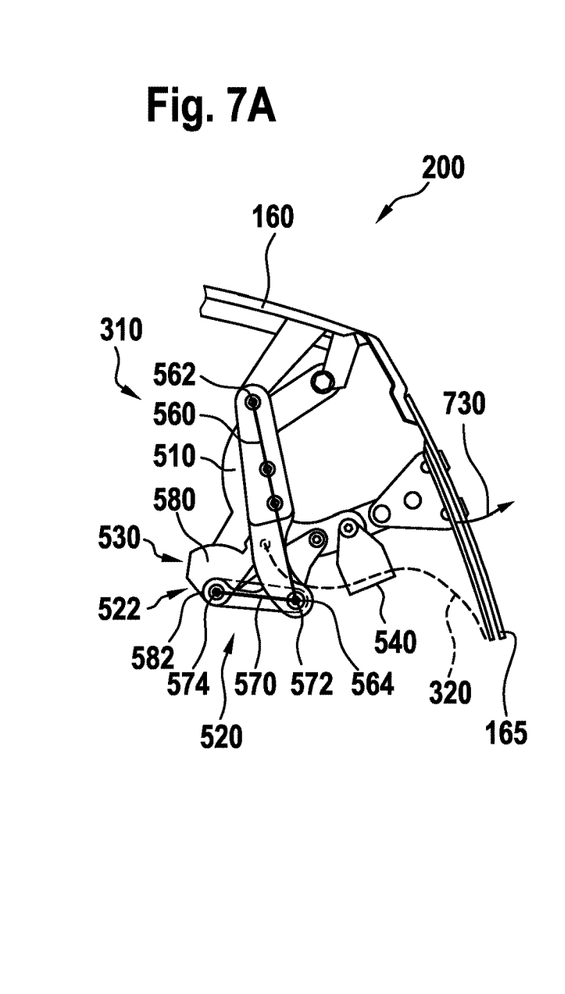
FIG. 7A is a diagram of the illustrative opening system of FIG. 6 with the cowling access door in a closed position and an overcentering latch in an unclamped state in accordance with some embodiments.

FIG. 7A is a diagram of the illustrative opening system 200 of FIG. 6 with the cowling access door 165 in a closed position and the overcentering latch 520 in an unclamped state 522. When the cowling access door 165 is in the closed position, the angle between the first rod 560 and the second rod 570 at the second and third end 564, 572 is smallest. In other words, the angle between the first and second rods 560, 570 increases during the opening operation of the cowling access door 165.

During the opening movement 730 of the cowling access door 165, the cowling access door 165 is rotated upwards, thereby pulling the bracket 510 outwards. Since the release lever 580 is pivotally attached to the bracket 510 at the release lever attachment point 582, pulling the bracket 510 outward causes the release lever 580 to rotate together with the second rod 570 around the third end 572 of the second rod 570, which continually increases the angle between the first and second rods 560, 570.

Figure 7B:
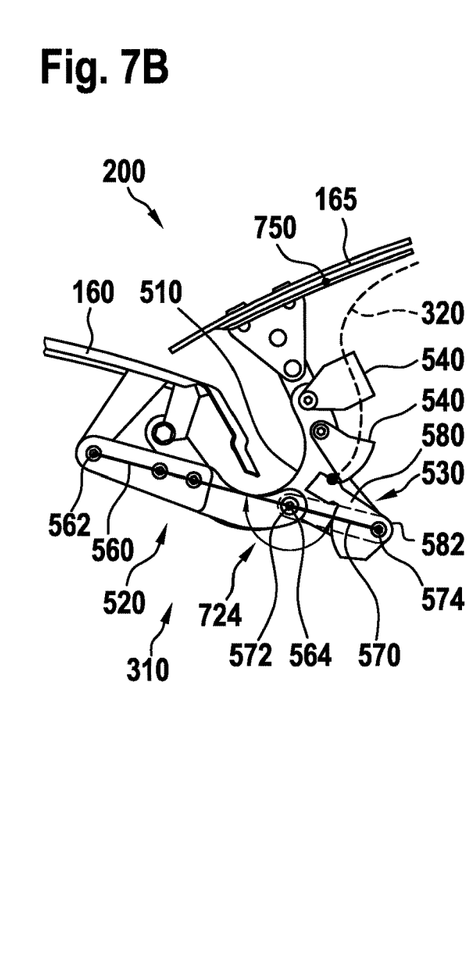
FIG. 7B is a diagram of the illustrative opening system of FIG. 6 with the cowling access door in an opened position and the overcentering latch in a centered state in accordance with some embodiments.

FIG. 7B is a diagram of the illustrative opening system 200 of FIG. 6 with the cowling access door 165 in an opened position at the maximal opening point 750. At the maximal opening point 750, the overcentering latch 520 is in a centered state 724. In other words, the angle between the first and second rods 560, 570 is 180°.

Releasing the cowling access door 165 from the maximal opening point 750 may automatically latch the cowling access door 165. For example, the overcentering latch 520 may automatically move from the centered state 724 to the over-centered state 726, which is shown in FIG. 7C.

Figure 7C:
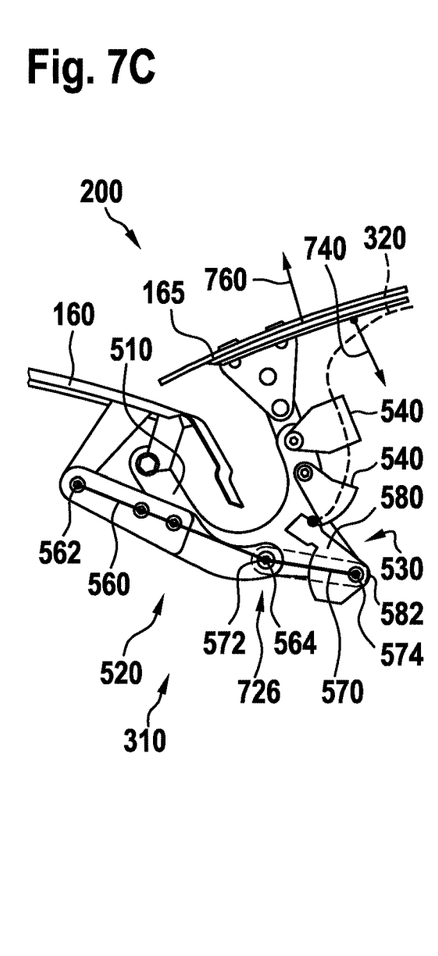
FIG. 7C is a diagram of the illustrative opening system of FIG. 6 with the cowling access door secured in the opened position and the overcentering latch in an over-centered state in accordance with some embodiments.

As shown in FIG. 7C, due to the automatically latching movement 740, the opening system 200 of FIG. 6 has secured the cowling access door 165 in the opened position and the overcentering latch has moved from the centered state to the over-centered state 726 in which the angle between the first and second rods 560, 570 is greater than 180°.

Illustratively, the overcentering latch 520 may include a mechanism that prevents a further increase of the angle between the first and second rods 560, 570 beyond the over-centered state, thereby latching and securing the cowling access door 165 in the opened position.

Thus, an operator may, with a single hand, move the cowling access door 165 from the closed position, in which the overcentering latch 520 in an unclamped state 522 as shown in FIG. 7A, to an opened and secured position, in which the overcentering latch 520 is in an over-centered state 726 as shown in FIG. 7C.

Moving the cowling access door 165 from the opened position in which the overcentering latch 520 is in the over-centered state 726 of FIG. 7C back to the closed position in which the overcentering latch 520 is in the unclamped state 522 as shown in FIG. 7A may involve an initial de-latching movement 760 of the cowling access door 165.

During the de-latching movement 760 shown in FIG. 7C, the cowling access door 165 is moved from the secured open position to the maximal opening point 750 of FIG. 7B. Simultaneously, the overcentering latch 520 may transition from the over-centered state 726 shown in FIG. 7C to the centered state 724 shown in FIG. 7B.

Releasing the cowling access door 165 from the maximal opening point 750 without any further action may automatically latch the cowling access door 165 in the secured open position, since the overcentering latch 520 may automatically move from the centered state 724 of FIG. 7B back the over-centered state 726 shown in FIG. 7C.

Illustratively, when the cowling access door 165 is at the maximal opening point 750 of FIG. 7B and the overcentering latch 520 in the centered state, pulling the Bowden cable 320 (e.g., using thumb lever 550 of the remote actuator 340 of FIG. 6) may pull on the release lever 580 of the release system 530.

By way of example, the release lever 580 that is pivotally attached to the hinge bracket 510 at the release lever attachment point 582 may rotate around the release lever attachment point 582 in response to the pull on the release lever 580, thereby moving the second rod 570 such that the overcentering latch 520 is moved from the centered state 724 of FIG. 7B to an unclamped position in which the overcentering latch 520 is in an unclamped state.

Releasing the cowling access door 165 when the overcentering latch 520 is in an unclamped state 522 may automatically move the cowling access door 165 to the closed position of FIG. 7A.

Thus, an operator may, with a single hand, move the cowling access door 165 from the opened and secured position, in which the overcentering latch 520 in an over-centered state 726 as shown in FIG. 7C, to the closed position, in which the overcentering latch 520 is in an unclamped state 522 as shown in FIG. 7A.

Figure 8:
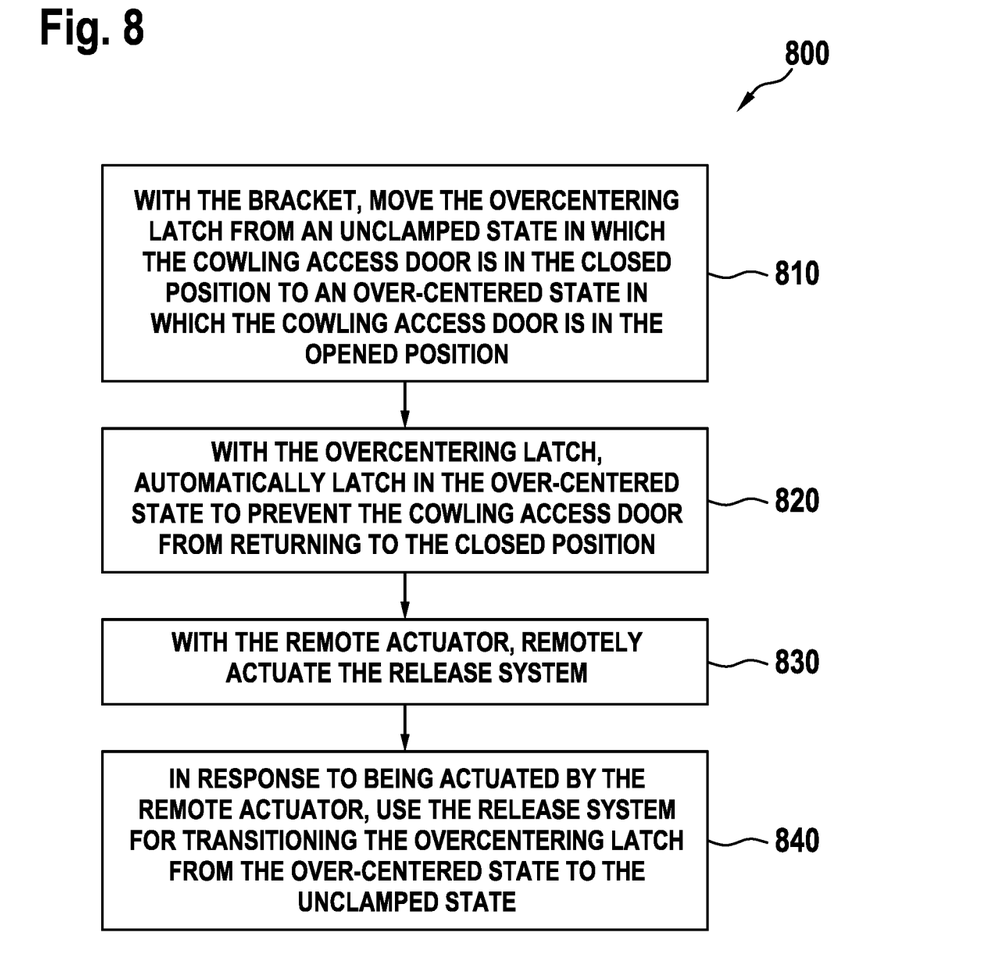
FIG. 8 is a flowchart showing illustrative operations for operating an opening system for a cowling access door in accordance with some embodiments.

FIG. 8 is a flowchart 800 showing illustrative operations for operating an opening system for a cowling access door.

During operation 810, a hinge bracket may move the overcentering latch from an unclamped state in which the cowling access door is in the closed position to an over-centered state in which the cowling access door is in the opened position.

For example, the hinge bracket 510 of FIG. 6 may move the overcentering latch 520 from an unclamped state 522 in which the cowling access door 165 is in the closed position as shown in FIG. 7A to an over-centered state 726 in which the cowling access door 165 is in the opened position as shown in FIG. 7C.

During operation 820, the overcentering latch may automatically latch in the over-centered state to prevent the cowling access door from returning to the closed position.

For example, the overcentering latch 520 of FIG. 7C may as a result of the automatically latching movement 740 automatically latch in the over-centered state 726, thereby preventing the cowling access door 165 from returning to the closed position.

During operation 830, the remote actuator may remotely actuate the release system.

For example, the remote actuator 340 of FIG. 6 may remotely actuate the release system 530.

During operation 840, in response to being actuated by the remote actuator, the release system may transition the overcentering latch from the over-centered state to the unclamped state.

For example, in response to being actuated by the remote actuator 340, the release system 530 of FIG. 6 may transition the overcentering latch 520 from the over-centered state 726 shown in FIG. 7C to the unclamped state 522 shown in FIG. 7A.

If desired, operation 840 may include moving the cowling access door from the secured open position to the maximal opening point to transition the overcentering latch from the over-centered state to a centered state, and using the release system to transition the overcentering latch from the centered state to the unclamped state.

For example, the cowling access door 165 of FIG. 6 may be moved during the de-latching movement 760 of FIG. 7C to the maximal opening point 750 shown in FIG. 7B, thereby transitioning the overcentering latch 520 from the over-centered state 726 of FIG. 7C to the centered state 724 of FIG. 7B. At the maximal opening point 750, the release system 530 of FIG. 6 may be used to transition the overcentering latch 520 from the centered state 724 shown in FIG. 7B to the unclamped state 522 shown in FIG. 7A.

It should be noted that modifications to the above described embodiments are within the common knowledge of the person skilled in the art and, thus, also considered as being part of the present disclosure.

For example, remote actuator 340 of FIG. 5 or FIG. 6 is shown with a thumb lever 550 that pulls on the Bowden cable 320. However, remote actuator 340 may include any means with which the Bowden cable 320 may be pulled. For example, remote actuator 340 may include a handle and/or may be actuated with any finger instead of the thumb.

Moreover, Bowden cable 320 of FIGS. 3 to 7C connect the remote actuator 340 with the release system 530. However, if desired, any means that allow to push or pull on the release lever 580 may be used instead. For example, a rod or a string may be used instead of a Bowden cable.

REFERENCE LIST

100 aircraft, rotary-wing aircraft, rotorcraft, helicopter
110 multi-blade rotor system
111 engine
112, 113 rotor blades
114 rotor head
115 rotor shaft
117 rotation axis
119 rotor plane
120 aircraft structure, fuselage
123 cabin
127 rear fuselage
130 tail boom
135 horizontal stabilizer
140 counter-torque device
145 tail rotor
150 fin
160 cowling
165 cowling access door
170 transmission cowling
175 crest cowling
180 engine cowling
200 opening system
310 cowling access door holder
320 Bowden cable
340 remote actuator
510 hinge bracket
520 overcentering latch
522 unclamped state
530 release system
540 cable guide
550 thumb lever
560 rod
562, 564 end of rod
570 rod
572, 574 end of rod
580 release lever
582 release lever attachment point
724 centered state
726 over-centered state
730 opening movement
740 automatically latching movement
750 maximal opening point
760 de-latching movement
800 method
810, 820, 830, 840 operations

What is claimed is:

1. An opening system for a cowling access door of a cowling, the cowling access door being movable between a closed position and an opened position, comprising:
   a hinge bracket that is adapted for pivotally attaching the cowling access door to the cowling;
   a cowling access door holder, comprising:
      an overcentering latch that is in an unclamped state when the cowling access door is in the closed position and movable from the unclamped state to an over-centered state when the cowling access door is moved from the closed position to the opened position, wherein the overcentering latch automatically latches in the over-centered state to prevent the cowling access door from returning to the closed position,
      a release system that is coupled to the overcentering latch and adapted for transitioning the overcentering latch from the over-centered state to the unclamped state and
   a remote actuator that is located spaced apart from the release system on the cowling access door and adapted for remotely actuating the release system;
   wherein the overcentering latch further comprises:

a first rod having a first end and a second end, wherein the first end is adapted for being pivotally attached to the cowling; and a second rod having a third end and a fourth end, wherein the third end is pivotally attached to the second end of the first rod;

wherein the release system further comprises:

a release lever that is pivotally attached to the hinge bracket at a release lever attachment point and coupled to the fourth end of the second rod.

2. The opening system of claim 1 wherein the release lever rotates around the release lever attachment point in response to a pull on the release lever, thereby moving the second rod from an over-centered position in which the overcentering latch is in the over-centered state to an unclamped position in which the overcentering latch is in the unclamped state.

3. The opening system of claim 1 wherein the release lever attachment point and the fourth end of the second rod coincide.

4. The opening system of claim 1 wherein the release lever attachment point and the fourth end of the second rod are separated.

5. The opening system of claim 1 further comprising:
a Bowden cable that connects the remote actuator with the release system.

6. The opening system of claim 5 wherein the release system further comprises:
a cable guide that is attached to the hinge bracket and guides the Bowden cable at least partially along the hinge bracket to the release system.

7. The opening system of claim 5 wherein the remote actuator pulls on the Bowden cable upon actuation.

8. The opening system of claim 7 wherein the remote actuator further comprises:
a thumb lever that is adapted for being pivotally attached to the cowling access door and for pulling on the Bowden cable upon actuation.

9. A cowling access door for a cowling of an aircraft comprising the opening system of claim 1.

10. An aircraft comprising the cowling access door of claim 9.

11. A method of operating the opening system of claim 1 comprising:
with the hinge bracket, moving the overcentering latch from an unclamped state in which the cowling access door is in the closed position to an over-centered state in which the cowling access door is in the opened position; and with the overcentering latch, automatically latching in the over-centered state to prevent the cowling access door from returning to the closed position.

12. The method of claim 11 further comprising:
with the remote actuator, remotely actuating the release system.

13. The method of claim 12 further comprising:
in response to being actuated by the remote actuator, using the release system for transitioning the overcentering latch from the over-centered state to the unclamped state.

14. An opening system for a cowling access door of a cowling, the cowling access door movable between a closed position and an opened position, comprising:

a hinge bracket pivotally attaching the cowling access door to the cowling;

a cowling access door holder comprising:

an overcentering latch that is in an unclamped state when the cowling access door is in the closed position and movable from the unclamped state to an over-centered state when the cowling access door is moved from the closed position to the opened position, wherein the overcentering latch automatically latches in the over-centered state to prevent the cowling access door from returning to the closed position;

a release coupled to the overcentering latch and adapted for transitioning the overcentering latch from the over-centered state to the unclamped state;

a remote actuator spaced apart from the release on the cowling access door and adapted for remotely actuating the release; and a Bowden cable that connects the remote actuator with the release;

wherein the release further comprises a cable guide attached to the hinge bracket to guide the Bowden cable at least partially along the hinge bracket to the release.

15. The opening system of claim 14 wherein the overcentering latch further comprises:

a first rod having a first end and a second end, wherein the first end is pivotally attached to the cowling; and a second rod having a third end and a fourth end, wherein the third end is pivotally attached to the second end of the first rod.

16. The opening system of claim 14 wherein the release further comprises:

a release lever pivotally attached to the hinge bracket.

17. The opening system of claim 16 wherein the release lever is pivotally attached to the hinge bracket at a release lever attachment point and coupled to the fourth end of the second rod.

18. An opening system for a cowling access door of a cowling, the cowling access door movable between a closed position and an opened position, comprising:

a hinge bracket pivotally attaching the cowling access door to the cowling;

a cowling access door holder, comprising:

an overcentering latch that is in an unclamped state when the cowling access door is in the closed position and movable from the unclamped state to an over-centered state when the cowling access door is moved from the closed position to the opened position, wherein the overcentering latch automatically latches in the over-centered state to prevent the cowling access door from returning to the closed position, a release coupled to the overcentering latch and adapted for transitioning the overcentering latch from the over-centered state to the unclamped state, the release having a lever pivotally attached to the hinge bracket and a remote actuator that is located spaced apart from the release on the cowling access door and adapted for remotely actuating the release system.

* * * * *